United States Patent [19]

Grow et al.

[11] Patent Number: 5,781,302
[45] Date of Patent: Jul. 14, 1998

[54] NON-CONTACT SHAPE METER FOR FLATNESS MEASUREMENTS

[75] Inventors: Robert J. Grow, Sandy; Richard W. Grow, Salt Lake City; Robert E. Benner, Holladay, all of Utah

[73] Assignee: Geneva Steel, Provo, Utah

[21] Appl. No.: 681,166

[22] Filed: Jul. 22, 1996

[51] Int. Cl.$^6$ .................................................. G01B 11/30
[52] U.S. Cl. .................................................. 356/371
[58] Field of Search .................................. 356/375, 376, 356/394, 371, 237, 445–448; 250/559.4

[56] References Cited

U.S. PATENT DOCUMENTS

| | | |
|---|---|---|
| 3,590,258 | 6/1971 | Shibata et al. . |
| 4,158,507 | 6/1979 | Himmel . |
| 4,332,477 | 6/1982 | Sato . |
| 4,763,006 | 8/1988 | Rau et al. . |
| 4,764,016 | 8/1988 | Johansson . |
| 4,803,374 | 2/1989 | Monfort et al. . |
| 4,836,680 | 6/1989 | Tröster et al. . |
| 4,877,326 | 10/1989 | Chadwick et al. . |
| 4,878,754 | 11/1989 | Homma et al. . |
| 4,978,861 | 12/1990 | Sabater et al. . |
| 5,125,741 | 6/1992 | Okada et al. . |
| 5,153,844 | 10/1992 | Beni et al. . |
| 5,206,700 | 4/1993 | Reynolds et al. . |
| 5,345,087 | 9/1994 | Luber et al. . |

FOREIGN PATENT DOCUMENTS

| | | |
|---|---|---|
| 2113522 | 9/1972 | Germany . |
| 6-26842 | 2/1994 | Japan . |
| 1772620 | 10/1992 | U.S.S.R. . |

*Primary Examiner*—K. Hantis
*Attorney, Agent, or Firm*—Madson & Metcalf

[57] ABSTRACT

A shape meter for measuring the deviation from flatness of a moving rolled steel plate is disclosed. The shape meter includes a laser source for generating an illuminated spot on the steel plate. The laser spot must be separable or distinguishable from background radiation emitted by the steel plate. For instance, if the steel plate is hot and the laser source is an argon laser generating blue green light, the optical filter must pass the blue green light and filter the red thermal emissions. The laser light is directed onto the moving steel plate, and a detector measures the light scattered from the steel plate. The detector includes an optical filter, an optical lens, and a lateral effect diode sensor. A computer then calculates and reports the deviation from flatness of the moving rolled steel plate based on the scattered light measured with the lateral effect diode sensor.

10 Claims, 4 Drawing Sheets

NON-CONTACT SHAPE METER FOR FLATNESS MEASUREMENTS

FIELD OF THE INVENTION

The invention relates to a shape meter apparatus for measuring the flatness of a steel surface. More particularly, the shape meter utilizes lasers coupled with suitable optical filters, lenses, and a lateral effect diode sensor (LEDS) to measure the vertical displacement of the steel surface above the horizontal roll line in real time.

BACKGROUND INFORMATION

Steel mills often have facilities for rolling hot steel ingots into flat plates. Hot steel ingots weighing many tons are rolled by giant rollers into sheets having a width ranging in size from a few feet to ten or more feet. It is common for the rolled steel plates to vary in flatness. This can be caused by defects in the rollers, vibration, irregular motor control, and cooling water irregularities. There is a need for monitoring the flatness and deviation from flatness of rolled steel plates. It also would be advantageous to have real time measurements of any deviation from flatness to enable prompt adjustment of steel mill rollers or computer automation.

The rolled plates can move through the mill at speeds up to thirty miles per hour. The mass and speed of the rolled steel plate is sufficient to destroy nearly anything in its path. Because of the destruction potential of fast-moving steel plates, it is important to locate any flatness detection equipment a safe distance away from the moving steel plates. For this reason, non-contact methods of measuring the flatness of hot steel are needed.

SUMMARY OF THE INVENTION

The present invention is directed to a shape meter for measuring the deviation from flatness of a moving rolled steel plate. The shape meter includes a laser source for generating a laser signal. The laser signal must be separable or distinguishable from background radiation emitted by the steel plate. For instance, when the steel plate is hot, the steel emits red thermal emissions. The laser signal is then preferably of blue green light so that the red light can be filtered with optical filters while allowing the blue green light to pass. The laser signal is directed onto the moving steel plate, and a detector measures the light scattered from the steel plate. The detector includes an optical filter, an optical lens, and a lateral effect diode sensor. A computer then calculates and reports the deviation from flatness of the moving rolled steel plate based on the scattered light from the laser spot on the steel plate measured with the lateral effect diode sensor.

The laser source is preferably liquid cooled, having an output power level less than 0.5 watts. Because the laser tube has a limited life, the laser source is preferably placed on low voltage standby when there is no steel to be measured. This helps extend the useful life of the laser tube. A shutter is optionally provided to block the laser signal when there is no steel present. The shutter provides a useful safety feature by preventing workers from being inadvertently exposed to laser light.

DESCRIPTION OF THE INVENTION

Figure 1:
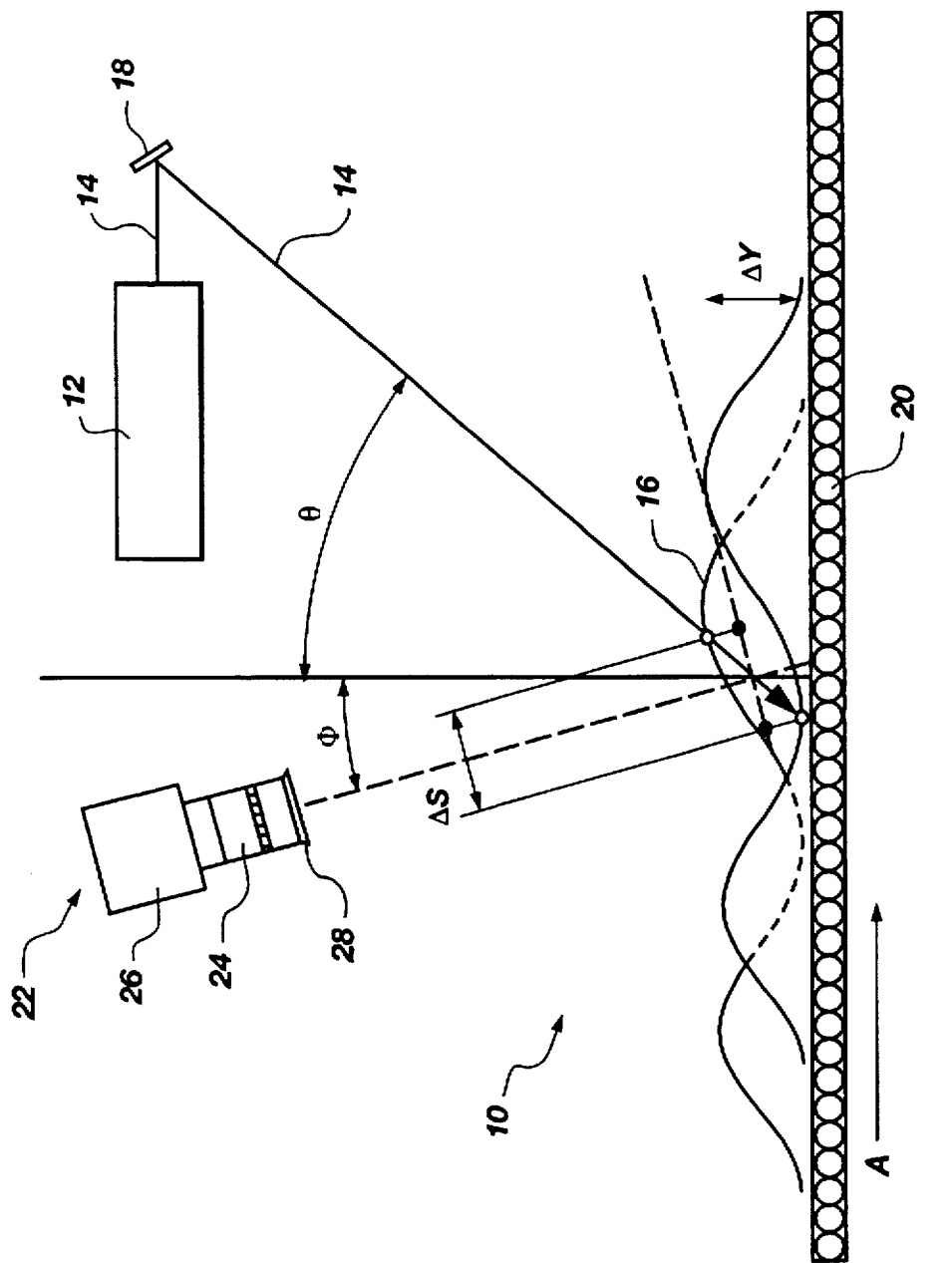
FIG. 1 discloses a schematic view of an apparatus for measuring the flatness of a steel surface within the scope of the present invention.

A non-contact shape meter for measuring the deviation from flatness of steel plates (preferably hot steel) using lateral effect diode sensors (LEDS) has been developed. A shape meter apparatus 10 for monitoring the flatness of the steel surface is shown in FIG. 1. The apparatus includes a laser source 12 which generates a laser beam 14 which is directed onto a moving steel plate 16. A mirror 18 is one presently preferred method of directing the laser beam 14 onto the steel plate 16. The laser beam 14 impinges on the moving steel plate 16 at an angle θ relative to a line perpendicular to the roll line surface 20 or the direction arrow A.

The laser source 12 is preferably a commercially available argon blue green laser generating light at 5145 Å (green light) and 4880 Å (blue light). Although other laser sources are possible, such as a helium/neon laser, they are currently not preferred because of insufficient power and difficulty in filtering the large amount of background thermal radiation from the hot steel. A suitable laser provides sufficient output power at a wavelength that will pass through a filter which blocks the background thermal radiation from the hot steel.

The laser source 12 is preferably operated at an output power level less than 0.5 watts so that the laser operates under class IIIb government guidelines. Of course, higher output power levels can be used, but they can result in greater expense and regulatory control.

Air cooled and liquid cooled lasers are available. Air cooled lasers are presently less preferred because the cooling fans tend to become fouled with particulates, particularly iron oxide, grease, and water, which are ubiquitous in a steel mill in the vicinity of the rolling operation. If a sufficient layer of iron oxide coats the fan electronics and the power supply, electrical short circuits are known to occur.

The point at which the laser beam 14 hits the steel plate 16 will be brightly illuminated even though there might not be a specularly reflected beam. A detector 22 is positioned at an angle Φ relative to a line perpendicular to the roll line surface 20 or the direction arrow A. The detector 22 includes an optical lens 24, lateral effect diode sensor (LEDS) 26, and one or more optical filters 28. The area surrounding the illuminated point is imaged using the optical lens 24 onto the active area of the LEDS 26. The LEDS is an analog device capable of providing superior speed and accuracy compared to digital light sensing devices, such as charge coupled devices (CCDs). Although CCDs can be used with lower power lasers than LEDS, CCDs require substantially more computer processing than LEDS to detect the movement of the illuminated spot on the steel surface. Therefore, in application, CCDs are slower than LEDS. A currently preferred LEDS may be obtained from Graseby Optronics, Orlando, Fla., Model 531 Optical Position Indicator.

The aperture of the optical lens can vary, but larger apertures are generally preferred in order to capture more of the scattered light. Typical optical lens aperture sizes range from about 3 to 4 inches. The improved performance obtained by larger aperture lenses must be balanced by the increased cost of the lenses. To minimize the effects of interfering thermal radiation, one or more optical filters 28 with high transmission at the laser wavelength will be positioned in front of the optical lens 24 to ensure that mainly light at the laser wavelength enters the detector 22. When blue green argon lasers are used, the optical filter should pass the blue green light and block the red background radiation.

As indicated in FIG. 1, if the surface of the steel is distorted by an amount ΔY above the roll line 20, then the position of the laser-illuminated spot on the steel will move by an amount ΔS. The LEDS will provide an accurate measurement of ΔS, and the magnitude of the distortion ΔY will be given by:

$$\Delta Y = \frac{\Delta S \cos\theta}{\cos(90 - \Phi - \theta)}$$

The LEDS can measure changes in the position of the illuminated point in the image of steel projected on the sensor as small as 1 μm. Consequently, if a 1 meter length of steel were projected onto a 1 cm long detector, then movements ΔS of the laser beam on the steel as small as 0.1 mm can be detected. The accuracy of the system greatly exceeds that required to measure the typical vertical displacement of a steel plate.

Referring to FIG. 1, as the steel surface moves between times T1 and T2, the position at which the laser beam illuminates the steel surface moves within the sensor's object plane by an amount ΔS. The vertical position ΔY is calculated using the equation above with the value for ΔS as measured by the lateral effect diode sensor (LEDS).

Since the LEDS can operate at frequencies exceeding 1 kHz, the ΔY measurements can be obtained at small intervals along the axis of the moving plate. In addition, several channels can easily be included to monitor ΔY at various positions across the plate such as at the edges or middle. In a currently preferred embodiment, illustrated best in FIG. 3, the number of channels needed to monitor the steel plate may be adjusted according to the width of the steel. For instance, five channels are preferably used to effectively monitor 10 feet wide steel plate while only three channels are preferably used to monitor 4 feet wide steel plate. The measured values of ΔY can then be used as a feedback signal for modifying the rolling parameters to improve flatness.

Figure 2:
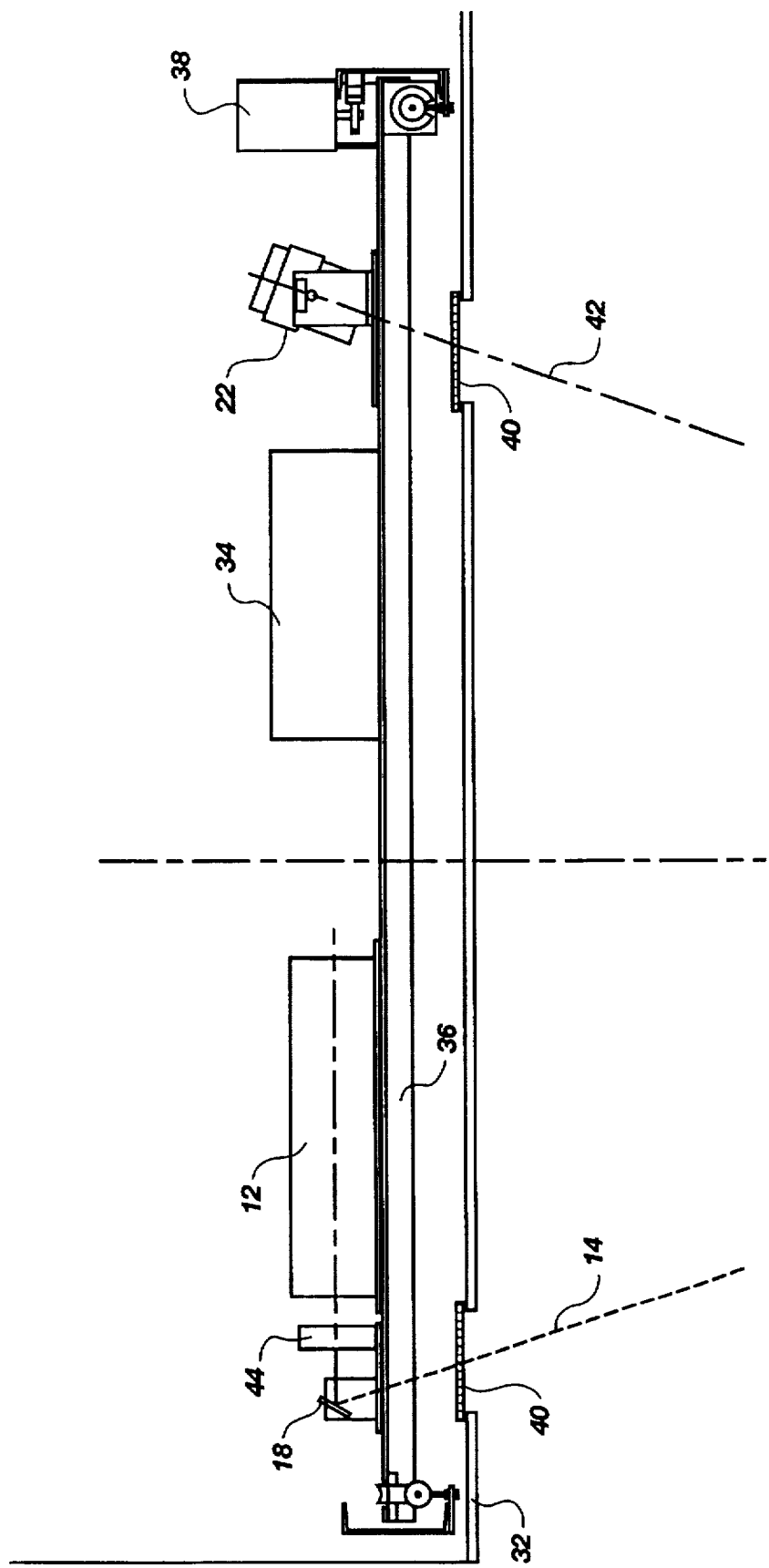
FIG. 2 illustrates a side view of one currently preferred embodiment of the apparatus of the present invention.

FIG. 2 illustrates a side view of a currently preferred operation configuration of the shape meter's components. The shape meter is preferably located above the steel's surface in a protected instrumentation room 32. As shown in FIG. 2, the laser source 12, laser power supply 34, and detector 22 are located on a chassis 36. The chassis 36 may be moved laterally using a stepper motor 38 so that different widths of rolled steel may be monitored. Optical windows 40 are provided to allow the laser beam 14 to exit the instrumentation room 32 and scattered light 42 to enter the instrumentation room 32. A shutter 44 is an optional safety feature to block the laser beam 14 and prevent laser light from inadvertently exiting the instrumentation room 32. The shutter can be computer controlled to shut when no moving steel is present.

Figure 3:
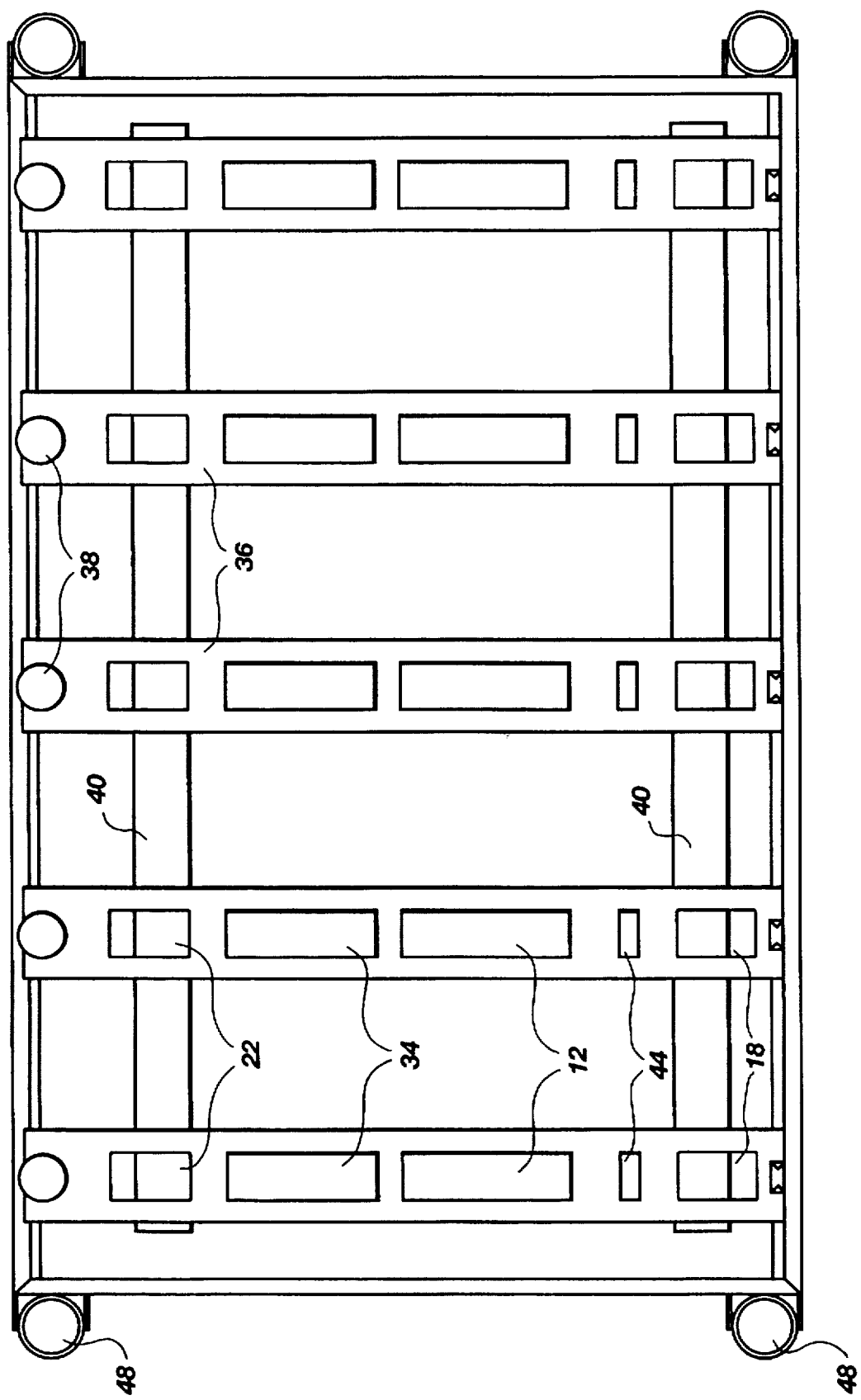
FIG. 3 illustrates a top view of one currently preferred embodiment of the apparatus of the present invention.

FIG. 3 illustrates a top view of a multi-channel shape meter. In a currently preferred operation configuration, five chassis would be used to obtain five channels of data for a steel width of about 10 feet. Air filled shock mounts 48 are preferably used to dampen the noise and vibration associated with the steel mill, thereby improving accuracy of the measured, reflected signal.

It is currently preferred to locate the shape meter as far away as possible from the steel plate's surface, yet close enough to obtain useful measurements of the laser's output beam at the steel surface. It is desirable to keep the shape meter away from the rolling steel to avoid possible destruction and/or thermal damage. It has been found that the shape meter functions adequately at a distance of about seven feet from the steel's surface. Of course, closer distances will also function adequately, but they also have a greater potential for equipment damage. Distances greater than about seven feet may also function adequately, but it has been found that the intensity of the reflected beam decreases as $x^{-1.7}$ where x is the distance from the source. Therefore, at distances greater than about seven feet, a more powerful laser source and/or a larger aperture optical lens will be required.

Figure 4:
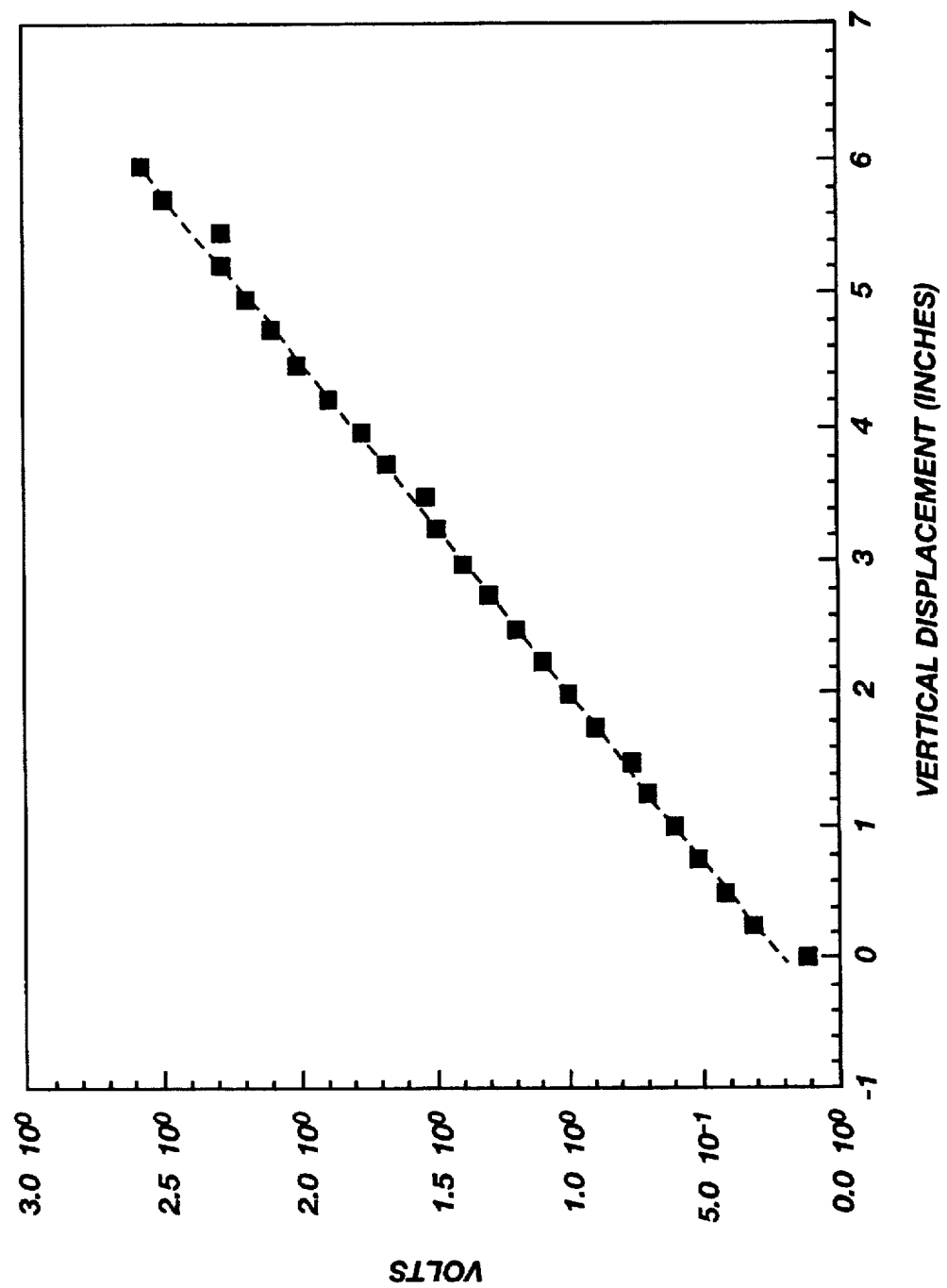
FIG. 4 shows a typical graph of volts versus vertical displacement used to calibrate the shape meter.

The detector shown in FIG. 2 includes a collecting lens, optical filter, and the LEDS mentioned above. The output from the LEDS is in volts and may be calibrated by measuring the signal reflected off steel plate of various thicknesses. FIG. 4 is a graph of volts versus vertical displacement used to calibrate the shape meter. Thus, if the measured output from the LEDS is 1 volt, then the vertical displacement of the steel is about 2 inches. Similarly, if the measured output is 2.5 volts, then the steel vertical displacement is about 6 inches. By use of appropriate feedback loops and computer controls, it is possible to measure and control the vertical displacement of the moving steel. A motorized calibration fixture which moves a test surface up and down in a vertical direction can be used to conveniently calibrate the shape meter apparatus.

The shape meter apparatus preferably includes electronic circuitry to put the laser source on a low voltage standby mode when no steel is present. In practice, steel is processed about 10% of the time. By reducing the laser source voltage, it is possible to prolong the useful operating life of the laser source.

The output from the LEDS is processed by a computer and provided to a steel mill operator in real time. This information can be used by the operator to adjust the steel mill rollers. Alternatively, the information can be used for total computer control of the steel rolling process.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A shape meter for measuring the deviation from flatness of a moving rolled steel plate comprising:

a laser source for generating a laser signal which can be detected in the presence of background radiation emitted by the steel plate;

means for directing the laser signal on the moving steel plate at an angle θ relative to a line perpendicular to the direction the steel plate is moving, wherein the laser signal forms a laser illuminated spot on the steel plate;

a detector comprising an optical filter, an optical lens, and a lateral effect diode sensor for measuring light scattered from the illuminated spot at an angle Φ relative to a line perpendicular to direction the steel plate is moving; and a computer for calculating and reporting the deviation from flatness of a moving rolled steel plate based on the scattered light measured with the lateral effect diode sensor according to the following equation:

$$\Delta Y = \frac{\Delta S \cos\theta}{\cos(90 - \Phi - \theta)}$$

wherein $\Delta Y$ is the amount of vertical displacement of the moving steel plate and $\Delta S$ is the position of the laser-illuminated spot on the steel plate.

2. A shape meter as defined in claim 1, wherein the steel plate is hot and wherein the optical filter filters thermal emissions from the hot steel plate.

3. A shape meter as defined in claim 1, further comprising means for lowering the output power of the laser source based on the presence of steel to be measured to increase the laser source lifetime.

4. A shape meter as defined in claim 1, further comprising a shutter for blocking the laser signal.

5. A shape meter as defined in claim 4, further comprising means for opening and closing the shutter based on the presence of steel to be measured.

6. A shape meter as defined in claim 1, wherein the optical lenses have an aperture size in the range from 3 to 4 inches.

7. A shape meter for measuring the deviation from flatness of a moving hot rolled steel plate comprising:

a source for generating a laser signal which can be detected in the presence of background radiation emitted by the steel plate, wherein the laser source has an output power level less than 0.5 watts;

means for lowering the output power of the laser source based on the presence or absence of steel plate to be measured to increase the laser source lifetime;

a shutter for blocking the laser signal;

means for opening and closing the shutter based on the presence or absence of steel plate to be measured;

means for directing the laser signal on the moving steel plate at an angle $\theta$ relative to a line perpendicular to the direction the steel plate is moving, wherein the laser signal forms a laser illuminated spot on the steel plate;

a detector comprising an optical filter, an optical lens, and a lateral effect diode sensor for measuring light scattered from the illuminated spot at an angle $\Phi$ relative to a line perpendicular to direction the steel plate is moving, wherein the optical lens has an aperture size in the range from 3 to 4 inches; and a computer for calculating and reporting the deviation from flatness of the steel plate based on the scattered light measured with the lateral effect diode sensor according to the following equation:

$$\Delta Y = \frac{\Delta S \cos\theta}{\cos(90 - \Phi - \theta)}$$

wherein $\Delta Y$ is the amount of vertical displacement of the moving steel plate and $\Delta S$ is the position of the laser-illuminated spot on the steel plate.

8. A shape meter as defined in claim 7, wherein the laser source is an argon laser generating a blue green laser signal.

9. A shape meter as defined in claim 7, wherein the laser source is liquid cooled.

10. A shape meter as defined in claim 7, wherein the laser source is air cooled.

* * * * *